United States Patent
Dewan et al.

(10) Patent No.: US 9,134,878 B2
(45) Date of Patent: Sep. 15, 2015

(54) DEVICE AND METHOD FOR SECURE USER INTERFACE GESTURE PROCESSING USING PROCESSOR GRAPHICS

(71) Applicant: Intel Corporation, Santa Clara, CA (US)

(72) Inventors: Prashant Dewan, Hillsboro, OR (US); Siddhartha Chhabra, Hillsboro, OR (US); Xiaozhu Kang, Fremont, CA (US); Xiaoning Li, Hillsboro, OR (US); Uday R. Savagaonkar, Portland, OR (US); David M. Durham, Beaverton, OR (US); Paul S. Schmitz, North Plains, OR (US); Michael A. Goldsmith, Lake Oswego, OR (US); Jason Martin, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/631,288

(22) Filed: Sep. 28, 2012

(65) Prior Publication Data

US 2014/0096068 A1    Apr. 3, 2014

(51) Int. Cl.
*G06F 3/041*    (2006.01)
*G06F 3/0481*    (2013.01)
(Continued)

(52) U.S. Cl.
CPC .............. *G06F 3/0481* (2013.01); *G06F 3/041* (2013.01); *G06F 3/04883* (2013.01); *G06F 21/74* (2013.01); *G06F 21/82* (2013.01)

(58) Field of Classification Search
CPC ................................ G06F 3/041; G06F 3/0481
USPC ......................................................... 715/781
See application file for complete search history.

(56) References Cited

U.S. PATENT DOCUMENTS

| 7,986,816 B1 | 7/2011 | Hoanca et al. |
| 2006/0210261 A1 | 9/2006 | Kakiuchi et al. |

(Continued)

FOREIGN PATENT DOCUMENTS

| JP | 11-339048 A | 12/1999 |
| JP | 2002-236666 A | 8/2002 |

(Continued)

OTHER PUBLICATIONS

"Gesture recognition," Wikipedia, The Free Encyclopedia, retrieved from: <http://en.wikipedia.org/w/index.php?title=Gesture_recognition&oldid=480270042>, edited Mar. 5, 2012, 6 pages.
U.S. Appl. No. 13/690,401, filed Nov. 30, 2012, 25 pages.
Intel, "Blu-ray Disc Playback on Intel Graphics FAQ", Aug. 6, 2014, 3 pages. retrieved from http://www.intel.com/support/graphics/sb/CS-029871.htm.

(Continued)

*Primary Examiner* — Andrea Leggett
(74) *Attorney, Agent, or Firm* — Barre Law Firm, PLLC (57) ABSTRACT

A device and method for securely rendering content on a gesture-enabled computing device includes initializing a secure execution environment on a processor graphics of the computing device. The computing device transfers view rendering code and associated state data to the secure execution environment. An initial view of the content is rendered by executing the view rendering code in the secure execution environment. A gesture is recognized, and an updated view of the content is rendered in the secure execution environment in response to the gesture. The gesture may include a touch gesture recognized on a touch screen, or a physical gesture of the user recognized by a camera. After the updated view of the content is rendered, the main processor of the computing device may receive updated view data from the secure execution environment.

20 Claims, 4 Drawing Sheets

(51) Int. Cl.
*G06F 3/0488* (2013.01)
*G06F 21/74* (2013.01)
*G06F 21/82* (2013.01)

(56) References Cited

U.S. PATENT DOCUMENTS

| | | | |
|---|---|---|---|
| 2008/0098229 A1* | 4/2008 | Hartrell et al. | 713/176 |
| 2010/0027853 A1 | 2/2010 | Wen | |
| 2012/0209614 A1* | 8/2012 | Kaburlasos et al. | 704/500 |
| 2013/0268777 A1 | 10/2013 | Grobman et al. | |
| 2014/0157410 A1 | 6/2014 | Dewan et al. | |
| 2014/0230046 A1 | 8/2014 | Dewan et al. | |

FOREIGN PATENT DOCUMENTS

| | | |
|---|---|---|
| JP | 2003-030659 A | 1/2003 |
| JP | 2004-252955 A | 9/2004 |
| JP | 2004-306821 A | 11/2004 |
| JP | 2005-308966 A | 11/2005 |
| JP | 2006-259923 A | 9/2006 |
| JP | 2010-182056 A | 8/2010 |
| KR | 10-0320626 B1 | 1/2002 |
| KR | 10-2008-0003299 A | 1/2008 |
| WO | 2010/147823 A1 | 12/2010 |
| WO | 2013/100898 A1 | 7/2013 |

OTHER PUBLICATIONS

International Preliminary Report on Patentability and Written Opinion Received for PCT Patent Application No. PCT/US2011/067367, mailed on Jul. 10, 2014, 5 pages.
International Search Report and Written Opinion received for PCT Patent Application No. PCT/US2011/067367, mailed on Sep. 14, 2012, 8 pages.
Toth, Bori, "Biometric Liveness Dectection", Information Security Bulletin, vol. 10, Oct. 2005, pp. 291-297.
Wikipedia—The Free Encyclopedia, "Multi-factor Aunthentication", Aug. 6, 2014, 20 pages.
Non-Final Office Action received for U.S. Appl. No. 13/976,918, mailed on Nov. 19, 2014, 12 pages.
Kang, Xiaozhu, "Methods and Apparatus for Multi-factor User Authentication with Two Dimensional Cameras", U.S. Appl. No. 14/492,163, mailed on Sep. 22, 2014, 38 pages.
Supplemental Notice of Allowability received for U.S. Appl. No. 13/976,918, mailed on Apr. 2, 2015, 5 pages.
Notice of Allowance received for U.S. Appl. No. 13/976,918, mailed on Mar. 20, 2015, 17 pages.
Office Action received for Japanese Patent Application No. 2014-550247, mailed on May 19, 2015, 3 pages of English Translation and 1 pages Of Japanese Office Action.

* cited by examiner

DEVICE AND METHOD FOR SECURE USER INTERFACE GESTURE PROCESSING USING PROCESSOR GRAPHICS

BACKGROUND

Gesture-based computing interfaces, such as touch screen computing, provide intuitive and natural user interaction for a wide variety of applications. Gesture-based computer interfaces typically employ a standard interaction scheme: an initial view of the interface is rendered on the display, the user interacts with the interface by performing a gesture, and an updated view of the interface is rendered based on the gesture. Such gesture computing often benefits from real-time rendering of the corresponding user interface. For example, zooming or panning in an application becomes more usable when the user interface tracks the user's fingers quickly and smoothly. To accomplish smooth content rendering in the user interface, many computing systems offload some or all of the content rendering to dedicated processor graphics circuitry, sometimes called a graphics processing unit ("GPU").

Traditionally, if any components of a computing device involved in a calculation or transaction were compromised due to malicious activity, the security of the entire calculation or transaction was potentially compromised. Therefore, security vulnerabilities in gesture response and view rendering components traditionally exposed the entire system to security vulnerabilities. For example, considering a secure bank transaction application, an attacker exploiting the view rendering component could switch "authorize" and "cancel" controls in the user interface, thereby causing the application to authorize transactions against the user's wishes. Or the attacker could access confidential data by directly copying an image of the rendered user interface. For example, considering a video editing application, an attacker may attempt to exploit the view rendering component to copy decoded video content and defeat copy protection mechanisms. Increased use of processor graphics in gesture-based computing may increase the potential attack surface exploitable by malicious attackers.

Computer processors have for some time included security primitives allowing the creation of hardware-enforced secure execution environments for code executing on the processor. Such secure execution environments protect against security vulnerabilities by verifying the authenticity of code and preventing access or modifications of code by unauthorized entities running on the processor itself. However, such processor-based secure execution environments generally do not provide the level of performance needed for graphics-intensive tasks like rendering content data in response to gesture input.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
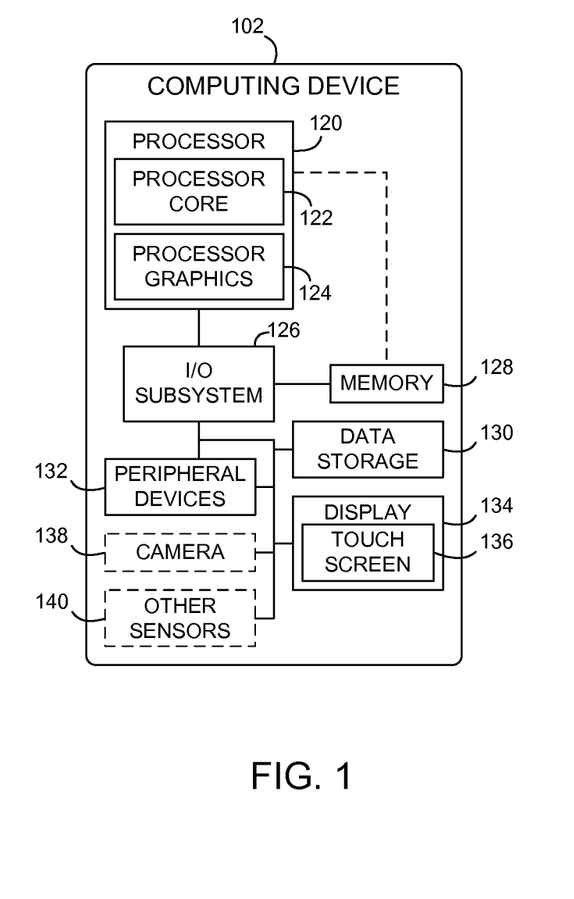
FIG. 1 is a simplified block diagram of at least one embodiment of a computing device to securely render content in response to a user interface gesture.

Referring now to FIG. 1, a computing device 102 securely renders content on a display. The computing device 102 is configured to display an initial view of the content, detect gesture input from a user, and display an updated view of the content in response to the gesture input. The computing device 102 securely renders both the initial and updated views of the content using a processor graphics circuitry.

The disclosed secure rendering of content in response to user interface gestures assures that the view rendering code has not been tampered with or otherwise exploited by a malicious attacker. In combination with secure execution of other components on the main processor, secure execution of processor graphics functions provides more complete protection for user transactions. Thus, the user may enter into sensitive transactions on a gesture-enabled computing device with increased confidence in the device's security. Further, compared to solutions entirely based on secure execution capabilities of the main processor, richer and more compelling user interactions are made possible by using the processor graphics.

The computing device 102 may be embodied as any type of computing device capable of performing the functions described herein. For example, the computing device 102 may be embodied as, without limitation, a computer, a smart phone, a tablet computer, a laptop computer, a notebook computer, a mobile computing device, a desktop computer, a work station, a cellular telephone, a handset, a messaging device, a vehicle telematics device, a network appliance, a web appliance, a distributed computing system, a multiprocessor system, a processor-based system, a consumer electronic device, a digital television device, and/or any other computing device configured to securely render content in response to user interface gestures. In the illustrative embodiment of FIG. 1, the computing device 102 includes a processor 120, an I/O subsystem 126, a memory 128, a data storage 130, and one or more peripheral devices 132. In some embodiments, several of the foregoing components may be incorporated on a motherboard or main board of the computing device 102, while other components may be communicatively coupled to the motherboard via, for example, a peripheral port. Furthermore, it should be appreciated that the computing device 102 may include other components, sub-components, and devices commonly found in a computing and/or communication device, which are not illustrated in FIG. 1 for clarity of the description.

The processor 120 of the computing device 102 may be embodied as any type of processor capable of executing software/firmware, such as a microprocessor, digital signal processor, microcontroller, or the like. The processor 120 is illustratively embodied as a single core processor having a processor core 122. However, in other embodiments, the processor 120 may be embodied as a multi-core processor having multiple processor cores 122. Additionally, the computing device 102 may include additional processors 120 having one or more processor cores 122.

The processor 120 is illustratively embodied as including a processor graphics 124. The processor graphics 124 may be dedicated graphics and media processing circuitry that may provide accelerated processing and rendering of three-dimensional graphics, two-dimensional graphics, and various video formats. The processor graphics 124 is generally characterized by heavily parallel computing resources and may be embodied as a plurality of programmable execution units. In some embodiments, the processor graphics 124 may include fixed-function execution units for functions such as geometry processing, transform and lighting, rasterization, media decoding, media encoding, and the like. In other embodiments, the processor graphics 124 may be adaptable to perform general-purpose computing.

The processor graphics 124 may include instructions allowing the establishment of a secure execution environment as discussed in more detail below with regard to FIG. 2. A secure execution environment is an execution environment including code and data that cannot be accessed by non-authorized entities executing on the processor graphics 124 or on the processor 120 due to hardware restrictions. Such entities may be embodied as applications, operating systems, libraries, drivers, virtual machines, virtualization machine monitors, processes, threads, or the like. The secure execution environment may be embodied as a secure enclave, a virtualized partition, a sandbox, or the like.

In some embodiments, the processor graphics 124 may be included on the same integrated circuit chip as the processor core 122. In other embodiments, the processor graphics 124 may be embodied as a separate integrated circuit chip included in the same physical package as the processor core 122. In still other embodiments, the processor graphics 124 may be included in the I/O subsystem 126, discussed in more detail below. In still other embodiments, the processor graphics 124 may be included on a separate expansion board communicatively coupled to the motherboard of the computing device 102.

The I/O subsystem 126 of the computing device 102 may be embodied as circuitry and/or components to facilitate input/output operations with the processor 120 and/or other components of the computing device 102. In some embodiments, the I/O subsystem 126 may be embodied as a memory controller hub (MCH or "northbridge"), an input/output controller hub (ICH or "southbridge"), and a firmware device. In such embodiments, the firmware device of the I/O subsystem 126 may be embodied as a memory device for storing Basic Input/Output System (BIOS) data and/or instructions and/or other information (e.g., a BIOS driver used during booting of the computing device 102). However, in other embodiments, I/O subsystems having other configurations may be used. For example, in some embodiments, the I/O subsystem 126 may be embodied as a platform controller hub (PCH). In such embodiments, the memory controller hub (MCH) may be incorporated in or otherwise associated with the processor 120, and the processor 120 may communicate directly with the memory 128 (as shown by the dashed line in FIG. 1). Additionally, in other embodiments, the I/O subsystem 126 may form a portion of a system-on-a-chip (SoC) and be incorporated, along with the processor 120 and other components of the computing device 102, on a single integrated circuit chip.

The processor 120 is communicatively coupled to the I/O subsystem 126 via a number of signal paths. These signal paths (and other signal paths illustrated in FIG. 1) may be embodied as any type of signal paths capable of facilitating communication between the components of the computing device 102. For example, the signal paths may be embodied as any number of point-to-point links, wires, cables, light guides, printed circuit board traces, vias, bus, intervening devices, and/or the like.

The memory 128 of the computing device 102 may be embodied as or otherwise include one or more memory devices or data storage locations including, for example, dynamic random access memory devices (DRAM), synchronous dynamic random access memory devices (SDRAM), double-data rate synchronous dynamic random access memory device (DDR SDRAM), mask read-only memory (ROM) devices, erasable programmable ROM (EPROM), electrically erasable programmable ROM (EEPROM) devices, flash memory devices, and/or other volatile and/or non-volatile memory devices. The memory 128 is communicatively coupled to the I/O subsystem 126 via a number of signal paths. Although only a single memory device 128 is illustrated in FIG. 1, the computing device 102 may include additional memory devices in other embodiments. Various data and software may be stored in the memory 128. For example, one or more operating systems, applications, programs, libraries, and drivers that make up the software stack executed by the processor 120 may reside in memory 128 during execution.

The data storage 130 may be embodied as any type of device or devices configured for the short-term or long-term storage of data. For example, the data storage 130 may include any one or more memory devices and circuits, memory cards, hard disk drives, solid-state drives, or other data storage devices. The data storage 130 may store the content to be rendered by the computing device 102. The data storage 130 may also store view rendering code and associated state data, as described in more detail below.

In some embodiments, the computing device 102 may also include one or more peripheral devices 132. Such peripheral devices 132 may include any number of additional input/output devices, interface devices, and/or other peripheral devices. For example, in some embodiments, the peripheral devices 132 may include a keyboard, speaker system, and/or other input/output devices, interface devices, and/or peripheral devices.

In the illustrative embodiment, the computing device 102 also includes a display 134 including a touch screen 136 and, in some embodiments, may include a camera 138 and other sensors 140. The display 134 of the computing device 102 may be embodied as any type of display capable of displaying digital information such as a liquid crystal display (LCD), a light emitting diode (LED), a plasma display, a cathode ray tube (CRT), or other type of display device. The touch screen 136 may be embodied as any type of touch screen capable of generating input data in response to being touched by the user of the computing device 102. The touch screen 136 may be embodied as a resistive touch screen, a capacitive touch screen, or a camera-based touch screen. The touch screen 136 may be responsive to multiple simultaneous touch points.

The camera 138 may be embodied as a digital camera or other digital imaging device integrated with the computing device 102. The camera 138 includes an electronic image sensor, such as an active-pixel sensor (APS), e.g., a complementary metal-oxide-semiconductor (CMOS) sensor, or a charge-coupled device (CCD). The camera 138 may have sufficient resolution to resolve gross visual gestures, e.g., waving an arm, of the user while the user is at a typical distance from the camera 138. In some embodiments, the camera 138 may have sufficient resolution to resolve fine visual gestures or facial features while the user is at a typical distance from the camera 138.

The other sensors 140 may be embodied as any electronic sensor capable of detecting a user interface gesture performed by the user of the computing device 102. The other sensors may be embodied as an infrared rangefinder, a proximity sensor, an eye tracking sensor, or the like.

Figure 2:
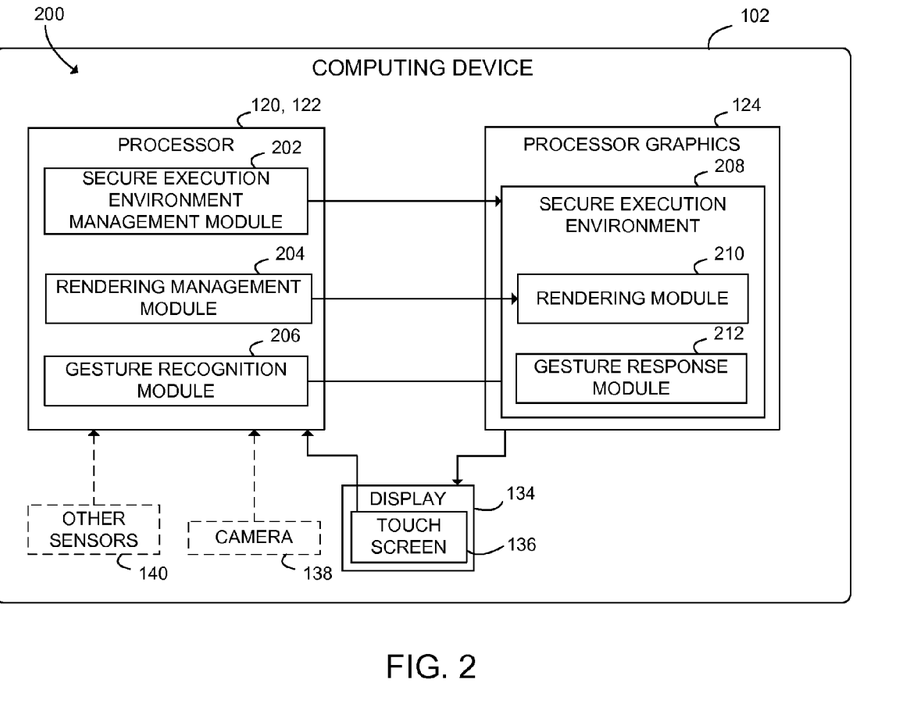
FIG. 2 is a simplified block diagram of at least one embodiment of an environment of the computing device of FIG. 1.

Referring now to FIG. 2, in one embodiment, the computing device 102 establishes an environment 200 during operation. The illustrative environment 200 includes a secure execution environment management module 202, a rendering management module 204, a gesture recognition module 206, a secure execution environment 208, a rendering module 210, and a gesture response module 212. The various modules and sub-environments of the environment 200 may be embodied as hardware, firmware, software, or a combination thereof.

The secure execution environment management module 202 is configured to initialize and otherwise manage the secure execution environment 208 on the processor graphics 124. In the illustrative embodiment, the secure execution environment management module 202 is implemented by processor 120 and/or the processor core 122. However, in some embodiments, the secure execution environment management module 202 may be implemented partially or wholly by the processor graphics 124. The secure execution environment management module 202 may utilize instructions on the processor 120 or the processor graphics 124 to manage the secure execution environment 208. In addition to initializing the secure execution environment 208, the secure execution environment management module 202 may finalize, dispose, and otherwise tear down the secure execution environment 208.

The rendering management module 204 is configured to transfer view rendering code and associated state data to the secure execution environment 208. Such view rendering code and associated state data may be loaded by the rendering management module 204 from the data storage 130. In some embodiments, the view rendering code and associated state data may be calculated or otherwise programmatically generated by the rendering management module 204.

The gesture recognition module 206 receives and interprets data from the touch screen 136, and in some embodiments from the camera 138 and the other sensors 140. The gesture recognition module 206 monitors such input data and, from the raw input data, recognizes user input gestures. The recognized input gestures are supplied from the gesture recognition module 206 to the secure execution environment 208. A user input gesture is a user movement intended to control some aspect of the computing device 102.

In some embodiments, the gesture recognition module 206 may recognize touch gestures input on the touch screen 136. Such touch gestures may be embodied as: tapping, that is, tapping a finger at a location on the touch screen 136; long-tapping, that is, tapping and holding a finger at a location on the touch screen 136; swiping, that is, sliding a finger from a first location to a second location on the touch screen 136; pinching and spreading, that is, sliding two fingers on the touch screen 136 either toward each other or apart from each other; and rotating, that is, sliding two fingers on the touch screen 136 roughly in a circle. Some touch gestures may be performed with any number of figures; for example, tapping, long-tapping, or swiping with two or more fingers. Some touch gestures may be associated with standardized control semantics. For example, tapping may be associated with selecting a user interface element, pinching and spreading may be associated with controlling the zoom level of the user interface, and swiping may be associated with moving content from place to place on the display 134. Certain touch gestures may be recognized by the gesture recognition module 206 substantially continuously during the touch gesture. For example, a pinching gesture may be recognized continuously, to allow the zoom level to be adjusted smoothly along with the pinching gesture.

In some embodiments, the gesture recognition module 206 may recognize visual gestures performed by the user, such as raising the user's arm, waving the user's arm, or the like. In some embodiments, the gesture recognition module 206 may recognize gestures performed by the user by varying facial features or expressions. In the illustrative embodiment, the gesture recognition module 206 is executed on the processor 120 and/or the processor core 122. However, in some embodiments, the gesture recognition module 206 may be executed on the processor graphics 124. Gesture detection based on facial recognition, in particular, may benefit from the parallel execution units offered by the processor graphics 124.

The secure execution environment 208 is established on the processor graphics 124. As discussed in more detail above, the processor graphics may include instructions or other hardware support for establishing the secure execution environment 208. Based on this hardware support, the code and data contained in the secure execution environment 208 are inaccessible to unauthorized entities running on either the processor graphics 124 or the processor 120 (and/or the processor core 122).

The rendering module 210 renders an initial view of the content using the view rendering code and associated state data, and in response to a user interface gesture recognized by the gesture recognition module 206, renders an updated view of the content. The rendering module 210 executes within the secure execution environment 208, which protects the rendering code and the rendered content from access or modification by unauthorized entities. The view rendering code may vary in complexity. In some embodiments, the view rendering code may include compositing or frame buffer manipulation code. In some embodiments, the view rendering code may include media decoding, such as video playing or transcoding. In other embodiments, the view rendering code may include general-purpose user interface code to draw and otherwise govern interactions with user interface elements.

The gesture response module 212 is configured to securely transmit updated view data from the secure execution environment 208 back to the processor 120 and/or processor core 122. Such updated view data may be useable by the processor 120 and/or processor core 122 to determine the result of a gesture-based user interaction, for example, a user selection. The gesture response module 212 may use instructions or other hardware support of the processor graphics 124 to ensure that the processor 120 and/or processor core 122 is authorized to receive the updated view data. In some embodiments, the gesture response module 212 may securely transfer the updated view data using cryptographic techniques.

Figure 3:
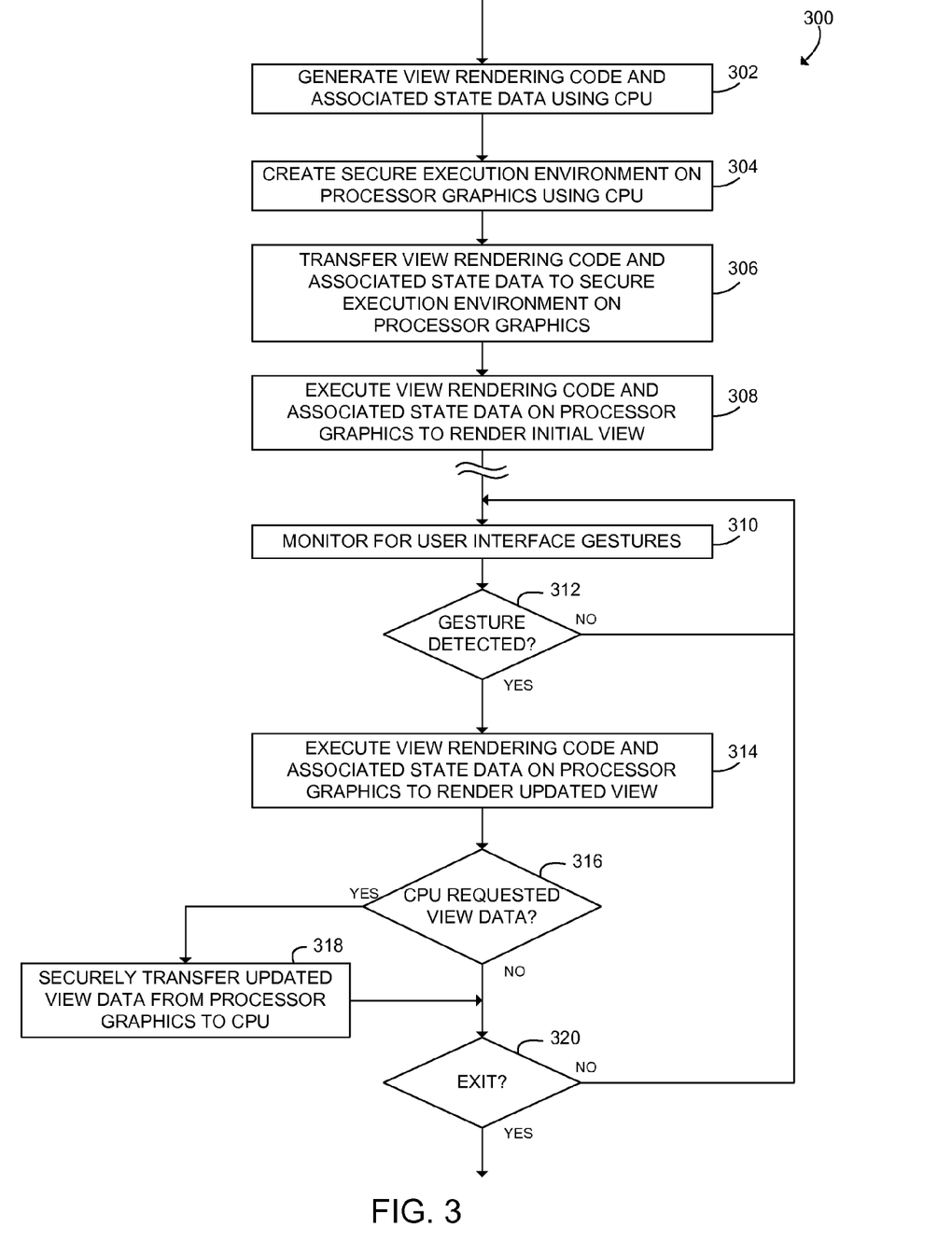
FIG. 3 is a simplified flow diagram of at least one embodiment of a method to securely render content in response to a user interface gesture, which may be executed by the computing device of FIGS. 1 and 2.

Referring now to FIG. 3, in use, the computing device 102 may execute a method 300 for securely rendering content in response to a user interface gesture. The method 300 begins with block 302 in which the rendering management module 204 generates view rendering code and associated state data. As discussed in more detail above, the view rendering code and associated state data may be retrieved from the data storage 130, or may be generated programmatically by the rendering management module 204.

In block 304, the secure execution environment management module 202 initializes the secure execution environment 208 on the processor graphics 124. As discussed in more detail above, the secure execution environment management module 202 may execute instructions on the processor graphics 124 to initialize the secure execution environment.

In block 306, the secure execution environment management module 202 transfers the view rendering code and associated state data to the secure execution environment 208 on the processor graphics 124. Such transfer may include measuring, signing, or otherwise verifying the authenticity of the view rendering code and associated state data before such code and data enters the secure execution environment 208. Once within the secure execution environment 208, the view rendering code and associated state data cannot be accessed or modified by unauthorized entities on the processor graphics 124 or the processor 120 and/or the processor core 122. This provides assurance that the view rendering code and associated state data will not be tampered with or otherwise compromised by security threats.

In block 308, the rendering module 210 executes the view rendering code within the secure execution environment 208 to render an initial view of the content. Because rendering occurs within the secure execution environment 208, the rendered view of the content remains protected from tampering or unauthorized access. This initial view is displayed on the display 134 of the computing device 102. In some embodiments, the content may be a bitmapped image. In other embodiments, the content may be a video feed. In other embodiments, the content may be a user interface element or grouping of user interface elements.

Figure 4A:
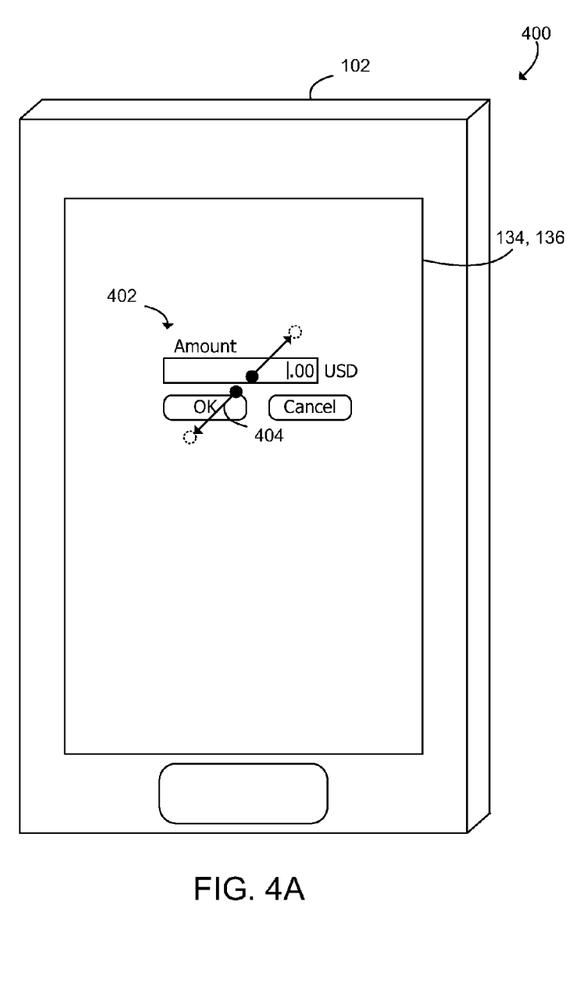
FIG. 4A is a simplified schematic diagram of an initial view of content securely rendered on the computing device of FIGS. 1 and 2.

In block 310, the gesture recognition module 206 monitors input data for user interface gestures. Such input data may be received from the touch screen 136, the camera 138, or the other sensors 140. For example, referring to FIG. 4A, the schematic diagram 400 illustrates a grouping of user interface elements 402 displayed on the display 134 of the computing device 102. The diagram 404 represents a spreading gesture recognized by the gesture recognition module 206. The closed circles of diagram 404 represent initial touch points for two of the user's fingers on the touch screen 136. The arrows of diagram 404 represent the movement of the user's fingers upon the touch screen 136. The hashed circles of diagram 404 represent the stopping points for the user's fingers on the touch screen 136.

Referring back to FIG. 3, in block 312 the computing device 102 determines whether a gesture has been detected by the gesture recognition module 206. If no gesture has been detected, the method 300 loops back to block 310 to continue monitoring for user interface gestures. If a gesture was detected, the method 300 proceeds to block 314.

In block 314, the rendering module 210 renders an updated view of the content in response to the user interface gesture detected by the gesture recognition module 206. To do so, the rendering module 210 executes the view rendering code within the secure execution environment 208. The resulting updated view of the content is displayed on the display 134 of the computing device 102. For example, referring to FIG. 4B, the schematic diagram 400 illustrates the grouping of user interface elements 402 displayed on the display 134 of the computing device 102. The view of the user interface elements 402 has been updated; that is, in response to the spreading gesture the view has been enlarged or "zoomed in."

Referring back to FIG. 3, in block 316, the computing device 102 determines whether the processor 120 and/or the processor core 122 has requested updated view data. The processor 120 and/or the processor core 122 may request the updated view data to determine a user selection or otherwise determine the results of the user interface gesture. If the processor 120 and/or the processor core 122 did not request view data, the method 300 proceeds to block 320, discussed in more detail below. If the processor 120 and/or the processor core 122 did request view data, the method 300 proceeds to block 318.

Figure 4B:
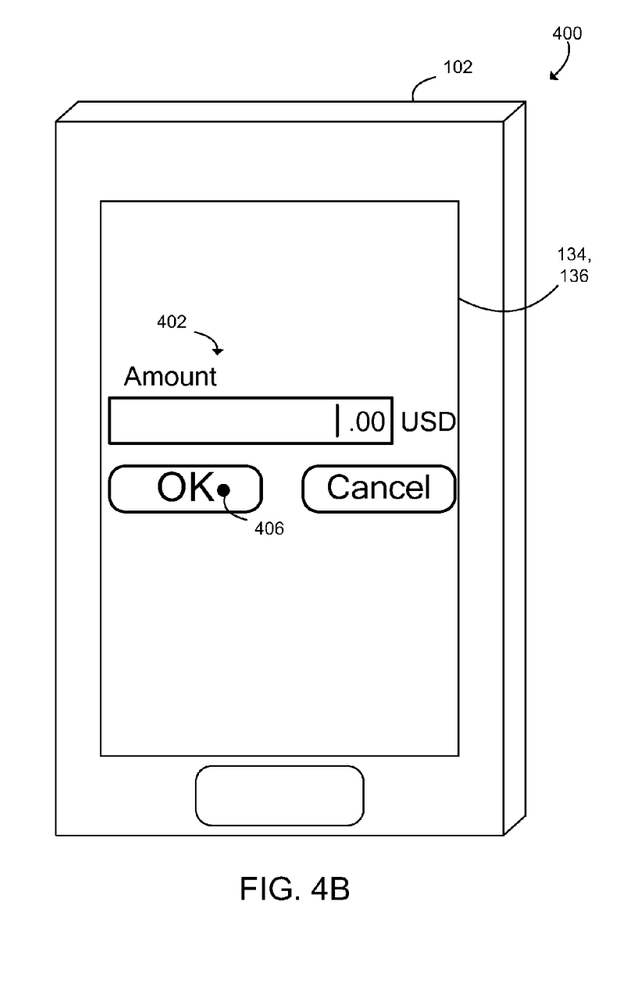
FIG. 4B is a simplified schematic diagram of an updated view of the content securely rendered on the computing device of FIGS. 1 and 2.

In block 318, the gesture response module 212 securely transfers updated view data from the secure execution environment 208 on the processor graphics 124 to the processor 120 and/or the processor core 122. As discussed above, the rendered view of the content is not accessible to unauthorized entities; therefore, secure transfer from the gesture response module 212 makes the output of the gesture interaction available to other components of the computing device 102. Such secure transfer may be embodied as verifying the authenticity of the entity on the processor 120 and/or the processor core 122 requesting the updated view data, encrypting the updated view data, or employing other techniques for secure data transfer. Such updated view data may be indicative of the updated view of the content; for example, a bitmap image representation of the updated view of the content. Such updated view data may be indicative of an updated display characteristic of the updated view of the content. For example, referring again to FIG. 4A, each user interface element of the grouping of user interface elements 402 may be associated with several display characteristics. For example, each user interface element may be associated with a height, a width, and a location on the display 134. Such display characteristics may define a "bounding box" wherein the user interface element receives user input. Referring now to FIG. 4B, after rendering an updated view of the content, the display characteristics for each user interface element of the grouping of user interface elements 402 may have changed. For example, after zooming the display, each user interface element likely has an updated bounding box and therefore should respond to user input at different locations on the touch screen 136. The closed circle 406 represents a tapping gesture detected on the touch screen 136 while the updated view of the content is displayed on the display 134. The processor 120 and/or the processor core 122 may use information regarding such tapping gesture along with the updated view data received from the gesture response module 212 to properly interpret the user's gesture. For example, the processor 120 and/or the processor core 122 may use the tapping gesture location and the updated view data to identify the user interface element selected by the tapping gesture.

Referring back to FIG. 3, in block 320, the computing device 102 determines whether to exit from the method 300. Exiting may be triggered by user input, such as closing or quitting the current application, switching to another application, minimizing a window, or the like. Exiting may also be triggered programmatically, as when a software application loads different content. If the computing device 102 determines not to exit the method 300, then the method 300 loops back to block 310 to continue detecting user interface gestures. Accordingly, the computing device 102 may continue to render updated views of the content in response to user interface gestures, allowing for smooth and responsive interaction with the user. If the computing device 102 determines to exit the method 300, then the method 300 stops processing. In some embodiments, upon exiting the method 300, the secure execution environment management module 202 may free, finalize, dispose, tear down, or otherwise terminate the secure execution environment 208, thereby freeing resources used by the secure execution environment 208.

EXAMPLES

Illustrative examples of the devices, systems, and methods disclosed herein are provided below. An embodiment of the devices, systems, and methods may include any one or more, and any combination of, the examples described below.

Example 1 includes a computing device to securely render content. The computing device includes a processor graphics to render content for display on a display; a gesture recognition module to detect a user interface gesture as a function of input data generated by an input device in response to an input received from a user of the computing device; a secure execution environment management module to (i) initialize a secure execution environment on the processor graphics and (ii) transfer view rendering code and associated state data to the secure execution environment; and a rendering module established in the secure execution environment of the processor graphics, the rendering module to execute the view rendering code to render an initial view of the content on the display; and render an updated view of the content as a function of the detected user interface gesture, using the view rendering code, to display the updated view of the content on the display.

Example 2 includes the subject matter of Example 1, and wherein the secure execution environment of the processor graphics comprises the gesture recognition module.

Example 3 includes the subject matter of any of Examples 1 and 2, and further includes a central processing unit, and wherein the secure execution environment further comprises a gesture response module to securely transfer updated view data from the secured execution environment to the central processing unit, in response to the central processing unit requesting updated view data.

Example 4 includes the subject matter of any of Examples 1-0, and wherein to securely transfer updated view data comprises to securely transfer updated view data that is indicative of the updated view of the content.

Example 5 includes the subject matter of any of Examples 1-4, and wherein the secure execution environment comprises a protected environment that is inaccessible to non-authorized entities executing on the processor core or the processor graphics.

Example 6 includes the subject matter of any of Examples 1-5, and wherein the input device comprises a touch screen, and wherein the gesture recognition module is to detect a touch gesture as a function of input data generated by the touch screen.

Example 7 includes the subject matter of any of Examples 1-6, and wherein the touch gesture comprises a touch gesture selected from the group consisting of: (i) a tapping gesture, in which the user taps a finger at a location on the touch screen; (ii) a long-tapping gesture, in which the user taps and holds a finger at a location on the touch screen; (iii) a swiping gesture, in which the user slides a finger from a first location on the touch screen to a second location on the touch screen; (iv) a spreading gesture, in which the user slides two fingers on the touch screen apart from each other; (v) a pinching gesture, in which the user slides two fingers on the touch screen toward each other; (vi) a rotating gesture, in which the user slides two fingers on the touch screen rotationally about a point on the touch screen; and (vii) a tapping, long-tapping, or swiping gesture performed with two or more fingers.

Example 8 includes the subject matter of any of Examples 1-7, and wherein the input device comprises a camera and the gesture recognition module is to detect a physical gesture as a function of data generated by the camera.

Example 9 includes the subject matter of any of Examples 1-8, and wherein the rendering module is to render the initial view of the content by executing the view rendering code to render a user interface element on the display; and render the updated view of the content by executing the view rendering code as a function of the detected user interface gesture to update the user interface element on the display.

Example 10 includes the subject matter of any of Examples 1-9, and wherein the rendering module is further to adjust a display characteristic of the user interface element as a function of the detected user interface gesture; the central processing unit is to receive second input data from the input device, the second input data being indicative of a user selection of the user interface element, request updated view data from the secure execution environment, the updated view data indicative of the adjusted display characteristic of the user interface element, determine the user selection of the user interface element based on the second input data and the updated view data, and cause the computing device to perform a function based on the user selection; and the secure execution environment further comprises a gesture response module to securely transfer the updated view data from the secure execution environment to the central processing unit in response to the request for updated view data.

Example 11 includes the subject matter of any of Examples 1-10, and wherein the rendering module is to render a video player element.

Example 12 includes the subject matter of any of Examples 1-11, and wherein the rendering module is to render the updated view of the content by executing the view rendering code to render a graphically scaled view of the initial view of the content.

Example 13 includes a method for securely rendering content on a display of a computing device, the method comprising initializing a secure execution environment on a processor graphics of the computing device; transferring view rendering code and associated state data from a processor core of the computing device to the secure execution environment; executing the view rendering code in the secure execution environment to render an initial view of the content on the display of the computing device; detecting a user interface gesture as a function of input data received from an input device of the computing device; and rendering an updated view of the content as a function of the detected user interface gesture, using the view rendering code executed in the secure execution environment, to display the updated view of the content on the display of the computing device.

Example 14 includes the subject matter of Example 13, and further includes generating the view rendering code and associated state data on the processor core.

Example 15 includes the subject matter of any of Examples 10 and 14, and wherein detecting the user interface gesture comprises detecting the user interface gesture in the secure execution environment.

Example 16 includes the subject matter of any of Examples 10-15, and further includes securely transferring updated view data from the secured execution environment to the processor core, in response to the processor core requesting updated view data.

Example 17 includes the subject matter of any of Examples 10-16, and wherein securely transferring updated view data comprises securely transferring updated view data that is indicative of the updated view of the content.

Example 18 includes the subject matter of any of Examples 10-17, and wherein initializing the secure execution environment on the processor graphics comprises initializing a protected environment that is inaccessible to non-authorized entities executing on the processor core or the processor graphics.

Example 19 includes the subject matter of any of Examples 10-18, and wherein detecting the user interface gesture comprises detecting a touch gesture as a function of input data received from a touch screen input device of the computing device.

Example 20 includes the subject matter of any of Examples 10-19, and wherein detecting the touch gesture comprises detecting a touch gesture selected from the group consisting of: (i) a tapping gesture, in which the user taps a finger at a location on the touch screen; (ii) a long-tapping gesture, in which the user taps and holds a finger at a location on the touch screen; (iii) a swiping gesture, in which the user slides a finger from a first location on the touch screen to a second location on the touch screen; (iv) a spreading gesture, in which the user slides two fingers on the touch screen apart from each other; (v) a pinching gesture, in which the user slides two fingers on the touch screen toward each other; (vi) a rotating gesture, in which the user slides two fingers on the touch screen rotationally about a point on the touch screen; and (vii) a tapping, long-tapping, or swiping gesture performed with two or more fingers.

Example 21 includes the subject matter of any of Examples 10-20, and wherein detecting the user interface gesture comprises detecting a physical gesture as a function of data received from a camera of the computing device.

Example 22 includes the subject matter of any of Examples 10-21, and wherein executing the view rendering code in the secure execution environment to render an initial view of the content comprises executing the view rendering code to display a user interface element on the display of the computing device; and rendering an updated view of the content as a function of the detected user interface comprises executing the view rendering code as a function of the detected user interface gesture to update the user interface element on the display of the computing device.

Example 23 includes the subject matter of any of Examples 10-22, and further includes adjusting, in the secure execution environment of the processor graphics, a display characteristic of the user interface element as a function of the detected user interface gesture; receiving, on the processor core, second input data from the input device of the computing device, the second input data being indicative of a user selection of the user interface element; requesting, on the processor core, updated view data from the secure execution environment of the processor graphics; securely transferring the updated view data from the secure execution environment to the processor core in response to requesting the updated view data, the updated view data indicative of the adjusted display characteristic of the user interface element; determining, on the processor core, the user selection of the user interface element based on the second input data and the updated view data; and performing, on the computing device, a function based on the user selection.

Example 24 includes the subject matter of any of Examples 10-23, and wherein executing the view rendering code to render the user interface element comprises rendering a video player element.

Example 25 includes the subject matter of any of Examples 10-24, and wherein executing the view rendering code as a function of the detected user interface gesture comprises executing the view rendering code to render a graphically scaled view of the initial view of the content.

Example 26 includes a computing device having a processor and a memory having stored therein a plurality of instructions that when executed by the processor cause the computing device to perform the method of any of claims 13-25.

Example 27 includes one or more machine readable storage media comprising a plurality of instructions stored thereon that in response to being executed result in a computing device performing the method of any of claims 13-25.

The invention claimed is:

1. A computing device to securely render content, the computing device comprising:
   a central processing unit with a processor core;
   a processor graphics to render content for display on a display, wherein the processor graphics comprises a programmable execution unit different from the processor core of the central processing unit;
   a gesture recognition module to detect a user interface gesture as a function of input data generated by an input device in response to an input received from a user of the computing device;
   a secure execution environment management module to (i) initialize a secure execution environment on the processor graphics and (ii) transfer view rendering code and associated state data to the secure execution environment; and
   a rendering module to execute in the secure execution environment of the processor graphics, the rendering module to:
   execute the view rendering code to render an initial view of the content on the display; and render an updated view of the content as a function of the detected user interface gesture, using the view rendering code, to display the updated view of the content on the display;

wherein, when the rendering module executes in the secure execution environment, the rendering module is not accessible by the processor core of the central processing unit.

2. The computing device of claim 1, wherein the secure execution environment of the processor graphics comprises the gesture recognition module.

3. The computing device of claim 1, wherein the secure execution environment further comprises a gesture response module to securely transfer updated view data from the secured execution environment to the central processing unit, in response to the central processing unit requesting updated view data.

4. The computing device of claim 1, wherein the input device comprises a touch screen, and wherein the gesture recognition module is to detect a touch gesture as a function of input data generated by the touch screen.

5. The computing device of claim 1, wherein the input device comprises a camera and the gesture recognition module is to detect a physical gesture as a function of data generated by the camera.

6. The computing device of claim 1, wherein the rendering module is to:
render the initial view of the content by executing the view rendering code to render a user interface element on the display; and
render the updated view of the content by executing the view rendering code as a function of the detected user interface gesture to update the user interface element on the display.

7. The computing device of claim 6, wherein:
the rendering module is further to adjust a display characteristic of the user interface element as a function of the detected user interface gesture;
the central processing unit is to:
receive second input data from the input device, the second input data being indicative of a user selection of the user interface element,
request updated view data from the secure execution environment, the updated view data indicative of the adjusted display characteristic of the user interface element,
determine the user selection of the user interface element based on the second input data and the updated view data, and
cause the computing device to perform a function based on the user selection; and
the secure execution environment further comprises a gesture response module to securely transfer the updated view data from the secure execution environment to the central processing unit in response to the request for updated view data.

8. A method for securely rendering content on a display of a computing device, the method comprising:
initializing a secure execution environment on a processor graphics of the computing device;
transferring view rendering code and associated state data from a processor core of a central processing unit of the computing device to the secure execution environment on the processor graphics, wherein the processor graphics comprises a programmable execution unit different from the processor core of the central processing unit;
executing the view rendering code in the secure execution environment to render an initial view of the content on the display of the computing device;
detecting a user interface gesture as a function of input data received from an input device of the computing device; and
rendering an updated view of the content as a function of the detected user interface gesture, using the view rendering code executed in the secure execution environment, to display the updated view of the content on the display of the computing device;
wherein the initial view and the updated view are not accessible by the processor core of the central processing unit.

9. The method of claim 8, wherein detecting the user interface gesture comprises detecting the user interface gesture in the secure execution environment.

10. The method of claim 8, further comprising securely transferring updated view data from the secured execution environment to the processor core, in response to the processor core requesting updated view data.

11. The method of claim 8, wherein detecting the user interface gesture comprises one of: detecting a touch gesture as a function of input data received from a touch screen input device of the computing device and detecting a physical gesture as a function of data received from a camera of the computing device.

12. The method of claim 8, wherein:
executing the view rendering code in the secure execution environment to render an initial view of the content comprises executing the view rendering code to display a user interface element on the display of the computing device; and
rendering an updated view of the content as a function of the detected user interface comprises executing the view rendering code as a function of the detected user interface gesture to update the user interface element on the display of the computing device.

13. The method of claim 12, further comprising:
adjusting, in the secure execution environment of the processor graphics, a display characteristic of the user interface element as a function of the detected user interface gesture;
receiving, on the processor core, second input data from the input device of the computing device, the second input data being indicative of a user selection of the user interface element;
requesting, on the processor core, updated view data from the secure execution environment of the processor graphics;
securely transferring the updated view data from the secure execution environment to the processor core in response to requesting the updated view data, the updated view data indicative of the adjusted display characteristic of the user interface element;
determining, on the processor core, the user selection of the user interface element based on the second input data and the updated view data; and
performing, on the computing device, a function based on the user selection.

14. One or more non-transitory machine readable storage media comprising a plurality of instructions that in response to being executed by a computing device enable the computing device to:
initialize a secure execution environment on a processor graphics of the computing device;
transfer view rendering code and associated state data from a processor core of a central processing unit of the computing device to the secure execution environment, wherein the processor graphics comprises a programmable execution unit different from the processor core of the central processing unit;

execute the view rendering code in the secure execution environment to render an initial view of the content on the display of the computing device;

detect a user interface gesture as a function of input data received from an input device of the computing device; and render an updated view of the content as a function of the detected user interface gesture, using the view rendering code executed in the secure execution environment, to display the updated view of the content on the display of the computing device;

wherein the initial view and the updated view are not accessible by the processor core of the central processing unit.

15. The non-transitory machine readable media of claim 14, wherein detecting the user interface gesture comprises detecting the user interface gesture in the secure execution environment.

16. The non-transitory machine readable storage media of claim 14, wherein the instructions further enable the computing device to securely transfer updated view data from the secured execution environment to the processor core, in response to the processor core requesting updated view data.

17. The non-transitory machine readable storage media of claim 14, wherein detecting the user interface gesture comprises detecting a touch gesture as a function of input data received from a touch screen input device of the computing device.

18. The non-transitory machine readable storage media of claim 14, wherein detecting the user interface gesture comprises detecting a physical gesture as a function of data received from a camera of the computing device.

19. The non-transitory machine readable storage media of claim 14, wherein:

executing the view rendering code in the secure execution environment to render an initial view of the content comprises executing the view rendering code to display a user interface element on the display of the computing device; and rendering an updated view of the content as a function of the detected user interface comprises executing the view rendering code as a function of the detected user interface gesture to update the user interface element on the display of the computing device.

20. The non-transitory machine readable storage media of claim 19, wherein the instructions further enable the computing device to:

adjust, in the secure execution environment of the processor graphics, a display characteristic of the user interface element as a function of the detected user interface gesture;

receive, on the processor core, second input data from the input device of the computing device, the second input data being indicative of a user selection of the user interface element;

request, on the processor core, updated view data from the secure execution environment of the processor graphics;

securely transfer the updated view data from the secure execution environment to the processor core in response to requesting the updated view data, the updated view data indicative of the adjusted display characteristic of the user interface element;

determine, on the processor core, the user selection of the user interface element based on the second input data and the updated view data; and perform, on the computing device, a function based on the user selection.

\* \* \* \* \*